United States Patent
Meinert

[19]

[11] Patent Number: 5,973,482
[45] Date of Patent: Oct. 26, 1999

[54] POWER BOOST CIRCUIT FOR A VOLTAGE REGULATOR

[75] Inventor: Maurice S. Meinert, Bethal Park, Pa.

[73] Assignee: RPM Industries, Inc., Washington, Pa.

[21] Appl. No.: 08/063,451

[22] Filed: May 18, 1993

[51] Int. Cl.⁶ .................................................. H02P 9/14
[52] U.S. Cl. ................................................ 322/86; 322/60
[58] Field of Search ........................................ 322/60, 86

[56] References Cited

U.S. PATENT DOCUMENTS

| 3,982,169 | 9/1976 | Cummins | 322/60 X |
| 4,222,002 | 9/1980 | Sundeen | 322/86 |
| 4,743,812 | 5/1988 | Dishner | 322/40 X |
| 4,827,393 | 5/1989 | Clark | 322/28 X |

Primary Examiner—Nestor Ramirez
Assistant Examiner—Nicholas Ponomarenko
Attorney, Agent, or Firm—Ansel M. Schwartz

[57] ABSTRACT

The present invention pertains to an apparatus for providing current. The apparatus comprises a voltage regulator for regulating output voltage of a generating device to a predetermined level. The apparatus is also comprised of a voltage boost circuit for maintaining a desired current out of the voltage regulator at lower efficiencies. The voltage boost circuit is in electrical communication with the voltage regulator. In a preferred embodiment, the voltage boost circuit includes means for storing energy and means for controlling when the storing means stores or releases its energy.

3 Claims, 4 Drawing Sheets

POWER BOOST CIRCUIT FOR A VOLTAGE REGULATOR

FIELD OF THE INVENTION

The present invention relates in general to voltage regulators. More specifically, the present invention relates to a voltage regulator having a power boost circuit.

BACKGROUND OF THE INVENTION

As shown in FIG. 1, the charging system of a typical motor vehicle consists of an alternator, voltage regulator, and battery. Internal to the alternator are the field coil (rotor), stator, rectifier bridge and the diode trio.

When current flows through the field coil, a magnetic field is produced. When the alternator shaft is rotated by the engine, a voltage is induced in the stator. The rectifier bridge converts AC voltage from the stator to a DC voltage needed for the charging of the vehicle's battery. The diode trio functions the same as the rectifier bridge but its output is used to supply current to the field coil. The voltage regulator limits the alternator output voltage to a preset level by controlling the field coil current.

On initial engine start-up, residual magnetism in the field coil generates a voltage in the stator which is rectified by the diode trio. This voltage is applied to the field coil by the voltage regulator and current flows through the field coil increasing the induced stator voltage and subsequently the voltage available for the field coil current. Since the rectifier bridge and diode trio anodes are connected commonly to the stator, the output voltage from the alternator and the voltage available to the field coil are approximately the same.

It is known in the past that at low engine speeds, the available output current from the alternator decreases due to the decrease in induced stator voltage. The voltage regulator attempts to maintain a constant voltage at the alternator output by increasing field coil current but is limited by the available voltage and magnetic saturation. As the stator voltage decreases, the resistance of the field coil will limit the field coil current proportionally to the voltage applied to the field coil.

The present invention provides a field voltage boost circuit that can be used between the diode trio and the field coil to increase the maximum available field current by increasing the voltage applied across the field coil. Increased output power from the alternator is achieved by this increased field current.

SUMMARY OF THE INVENTION

The present invention pertains to an apparatus for providing energy. The apparatus comprises a voltage regulator for regulating output voltage of the generating device to a predetermined level. The apparatus is also comprised of a voltage boost circuit for maintaining a desired current out of the voltage regulator at lower efficiencies. The voltage boost circuit is in electrical communication with the voltage regulator.

In a preferred embodiment, the voltage boost circuit includes means for storing energy and means for controlling when the storing means stores or releases its energy.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
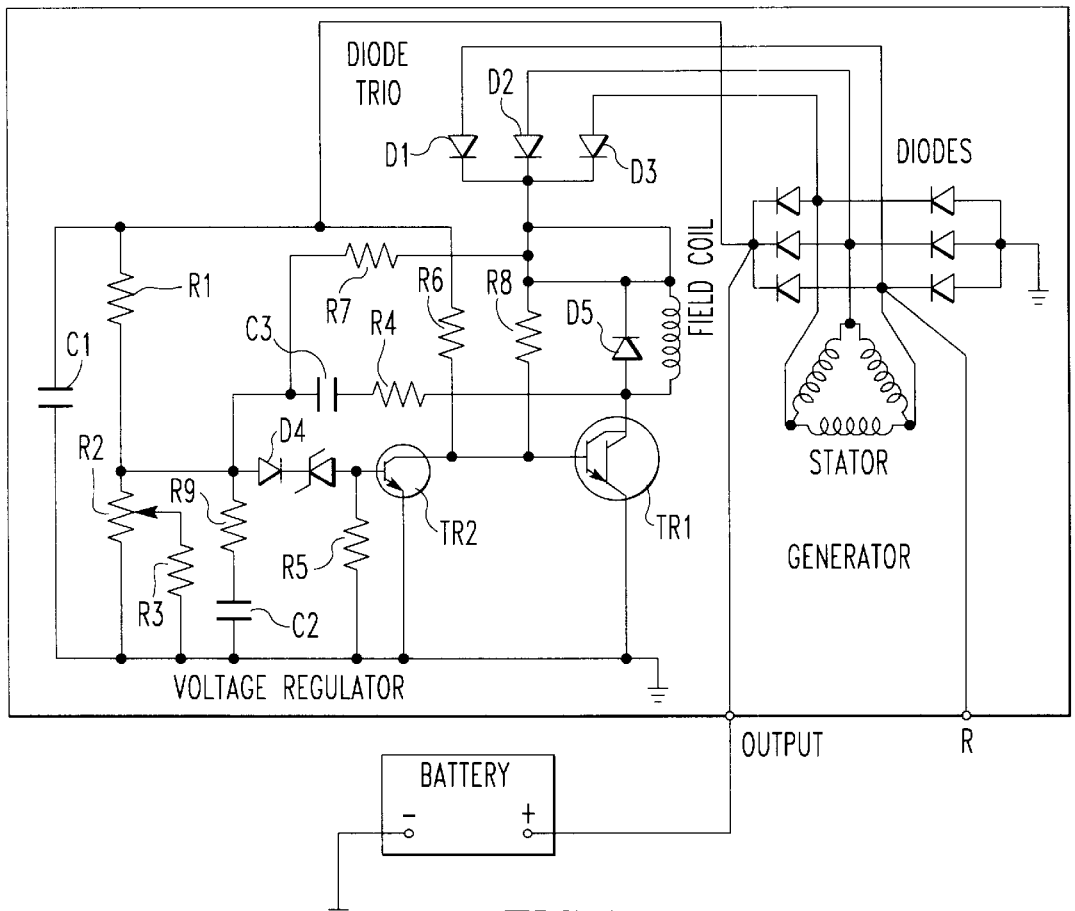
FIG. 1 is a schematic representation of a prior art voltage regulator, alternator and battery combination.
Figure 2A:
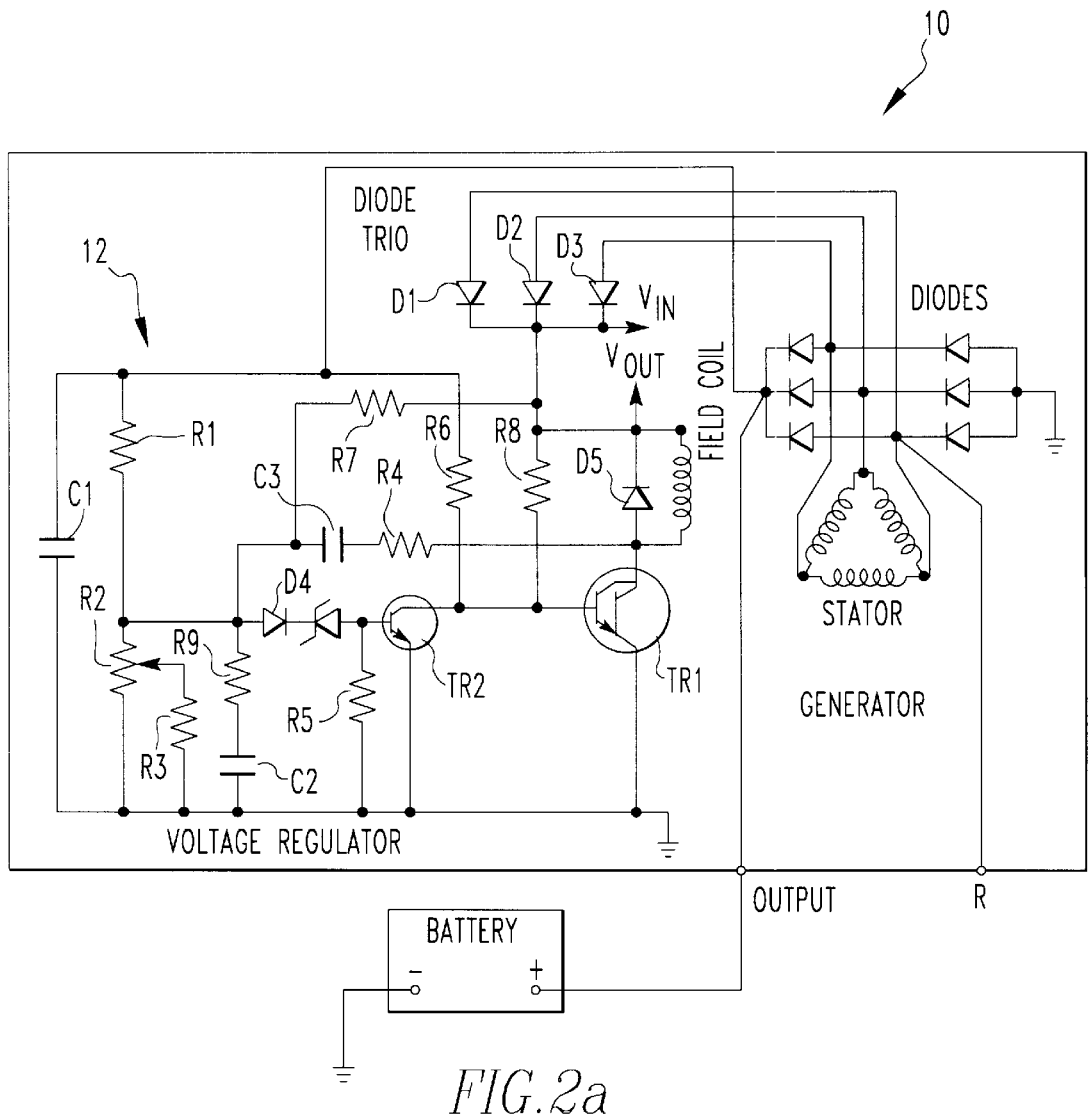
FIG. 2a is a schematic representation of an apparatus for providing field coil current of the present invention.
Figure 2B:
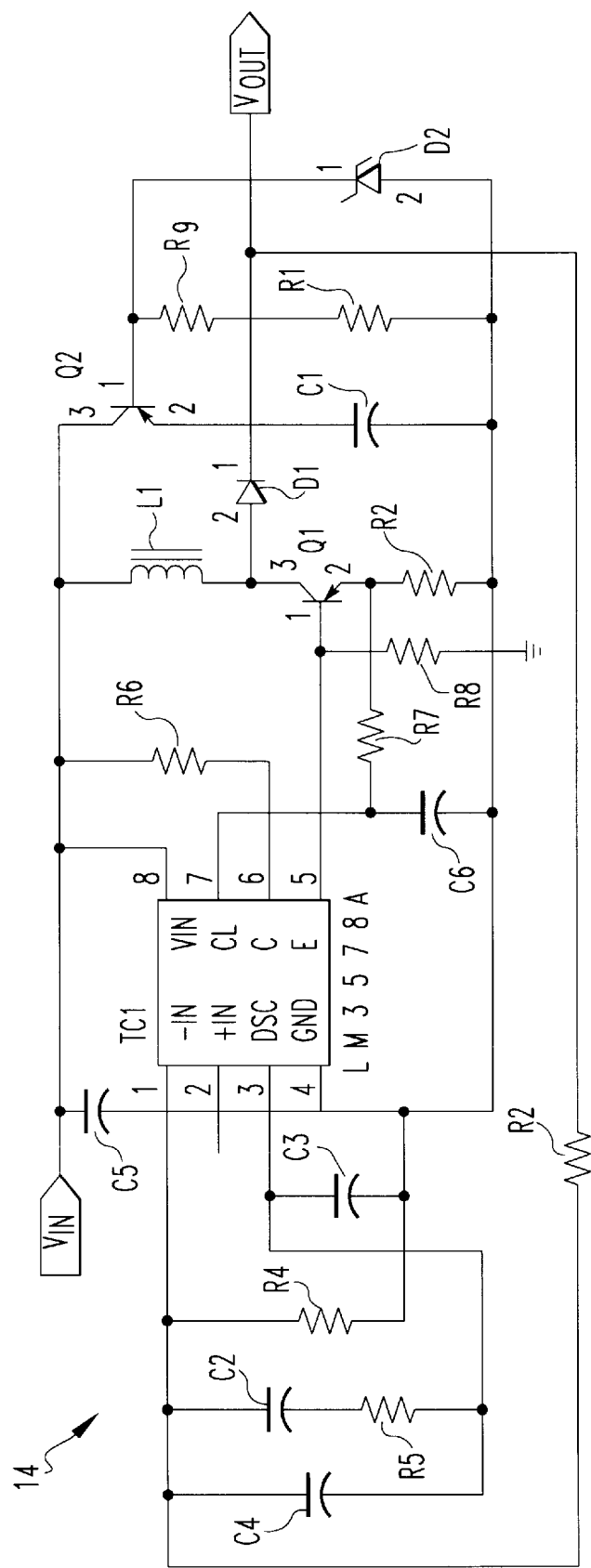
FIG. 2b is a schematic representation of a boost circuit of the present invention.

Referring now to the drawings wherein like reference numerals refer to similar or identical parts throughout the several views, and more specifically to FIGS. 2a and 2b thereof, there is shown an apparatus 10 for providing current. The apparatus 10 comprises a voltage regulator 12 for regulating output voltage of a generating device, such as a motor (not shown), at a predetermined level. The apparatus 10 is also comprised of a boost circuit 14 for maintaining a desired current out of the voltage regulator 12 at lower efficiencies. The voltage boost circuit 14 is in electrical communication with the voltage regulator 12. Preferably, as shown in FIG. 2a, the Vin and Vout of the circuit 14 of FIG. 2b is connected to the Vin and the Vout of FIG. 2a, respectively. Essentially what the boost circuit 14 accomplishes is that it stores energy from Vin and delivers this energy along with energy obtained directly from Vin to Vout.

The boost circuit 14 preferably includes means for storing energy. Additionally, the boost circuit 14 preferably includes means for controlling when the storing means stores or releases its energy. The controlling means is in electrical communication with the storing means.

The boost circuit can include an output port Vout and the storing means can preferably include an inductor L1 in communication with the generating device which obtains energy therefrom, and with the output port Vout to provide current thereto. The storing means preferably also includes a capacitor C1 in communication with the inductor L1 to receive energy from it so it can be charged, and in communication with the output port Vout to provide current to it when the capacitor C1 is discharging.

Preferably, the controlling means includes a switch Q1 in communication with the inductor L1 and the capacitor C1 for controlling whether they are charging or discharging. The controlling means can also include a pulse width modulator (PWM) IC1 which senses when voltage from Vout is below a desired voltage and turns the switch Q1 on and off, causing the inductor L1 to store energy and the capacitor C1 to discharge when the switch Q1 is on, and causing the inductor L1 to deliver the stored energy and the capacitor C1 to charge when the switch is off until the desired voltage at the output port Vout is obtained. The PWM IC1 is in communication with the switch Q1 and the generating device. The control means preferably also includes a diode D1 for controlling current between the inductor L1 and the capacitor C1. The diode D1 is forward biased when the switch Q1 is off and reversed biased when the switch Q1 is on.

The oscillation frequency of the PWM IC1 is preset through its port 3 such that when the voltage of the apparatus 12 is sensed at point 20 to be below the desired voltage, such as 35 volts, the 1 port of the PWM IC1 receives this fact and causes the PWM IC1 through the port E to turn the switch Q1 on and off at the preset oscillation frequency until the voltage sensed at point 20 is again at a predetermined level, such as 35 volts.

The switch Q1 is grounded such that when it is turned on, it essentially shorts the inductor such that current passes to ground through the switch when it is on.

There is a resistor R1 in series with the capacitor C1 in the boost circuit 14 which dampens the output current provided to the output port via such that the PWM IC1 is given time to react to the voltage condition when the voltage reaches the predesired level and thus turns off. The switch Q2 acts as a safety valve to the circuit of 14 in the event that there is a transient current or voltage spike that could be dangerous to the integrity of the circuit elements. Q2 is turned on when the voltage across zener diode D2 exceeds its zener voltage. Q2 shuts the inductor L1 keeping the voltage Vout clamped. Resistor R9 aids in turning Q2 off. The PWM IC1 also comes with a stabilizing circuit 22 to stabilize the PWM IC1 as described in National Semiconductor's General Description for LM1578A/LM2578A/LM3578A Switching Regulator.

In the operation of the invention, the boost circuit stores power in L1 and then delivers this power, plus power from the stator, to the field. When Q1 is on, the rectified stator voltage is applied across inductor L1. D1 is reverse biased and electrical energy is transferred to and stored in L1 by the stator. When Q1 is turned off, D1 becomes conductive, and electrical energy from the stator along with the electrical energy stored in L1 is transferred to C1 and the field. C1 provides current to the field when D1 is reversed biased. Q2 provides a path for the energy stored in L1 to flow when the voltage regulator shuts field current off because the alternator preset voltage has been reached.

By controlling the on/off time of Q1, the voltage applied across the field can be regulated. This function is maintained internally by IC1 switching regulator integrated circuit. The voltage divider R3 and R4 set the regulation point for field voltage controlled by IC1. R5 and C2, C5 provide stability for the IC1 regulator loop. C3 sets the internal switching frequency for IC1 (max on/off time). R2 is used by IC1 to limit the current through Q1 to prevent damage by over current. C4 provides filtering for the rectified stator voltage.

In the preferred embodiment, the values of parts used are identified in Table I.

TABLE I

| R1 | 3.3K | R8 | 10 OHMS | L1 | 300 uH |
|---|---|---|---|---|---|
| R2 | .02 OHMS | R9 | 220 OHMS | D1 | 505Q10D |
| R3 | 360K | C1 | 1000 uF | D2 | 1N5366 |
| R4 | 10K | C2, C3 | 2200 pF | Q1 | TIP35C |
| R5 | 220K | C4 | 33 pF | Q2 | TIP31C |
| R6 | 120 OHMS | C5 | 470 uF | | |
| R7 | 1K | C6 | 120 pF | | |

Additionally, there can be means for initially generating output current from an alternator to the voltage boost circuit 14 and the voltage regulator 12. The initially generating output means is electrically connected to the alternator, the voltage boost circuit 14 and the voltage regulator 12. The reason for the initially generating output means is that when the induced stator voltage is below a certain threshold, the voltage regulator 12 itself becomes inoperative and no current will flow through the field coil. The circuit shown in FIG. 3 will permit field current to flow at low stator voltages. With increased field current, the stator voltage will increase making the voltage regulator operative. The added circuit will discontinue its effect on the field coil once the stator voltage is at a determined value.

Figure 3:
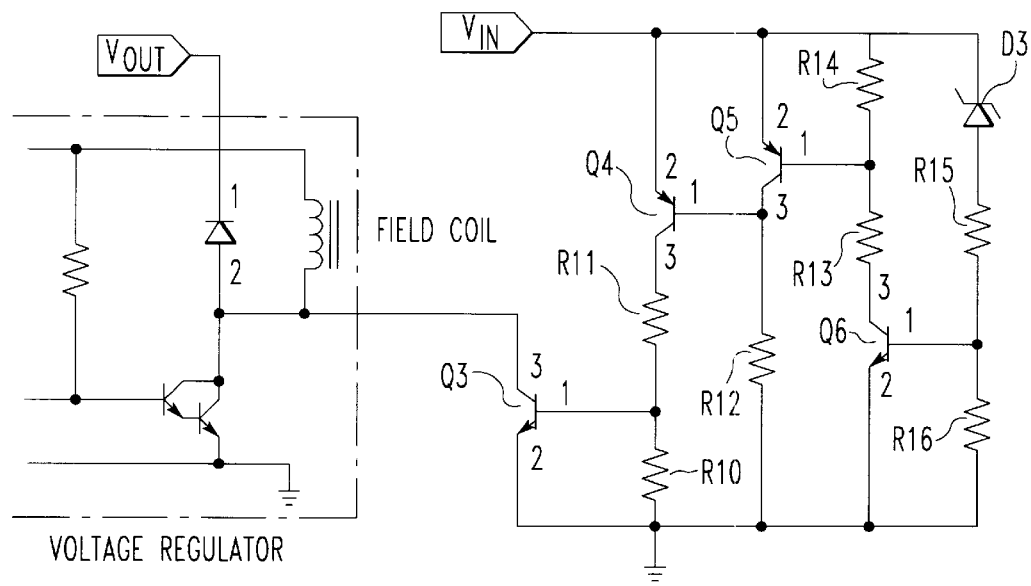
FIG. 3 is a schematic representation of a circuit for initially generating output current.

Referring to FIG. 3, which is a schematic representation of the initially generating output means, it essentially acts as a kickstart when the engine is first turned on for current to flow from the alternator to the boost circuit 14 and the voltage regulator 12 until a voltage within the operational range of the voltage regulator 12 is attained. A description of the initially generating output means operation follows.

With reference to FIG. 3, Q3 is used as a switch for the field coil current. When Q3 is turned on, field current will flow through Q3's collector to ground. When Q5 is off, Q4 is on and provides base current to turn Q3 on. R10 is used to limit the base current of Q3 and R10 aids in turning Q3 off. Q4 is turned off by Q5 turning on and shunting Q4's base to emitter junction. No Q3 base current is provided to keep Q3 on when Q4 is off.

Q6 is a voltage sensitive switch. If VIN is below D3's zener voltage, Q6 is off. Once VIN reaches a voltage above the zener voltage of D3 and the voltage needed to forward bias Q6 base to emitter junction, Q6 will turn on. R15 limits the current through D3 and the base of Q6 to a safe level. R16 aids in keeping Q6 off when VIN is below D3's zener voltage. When Q6 is turned on by a predetermined VIN level, current will flow through Q6 collector, R13, and Q5's base. Q5 will be turn ON which turns off Q4 and Q3. R14 aids in turning Q5 off.

Table II provides the values of parts used in the preferred embodiment of FIG. 3.

TABLE II

| A10 - | 470 OHMS | Q3 - | TIP35C |
|---|---|---|---|
| A11 - | 47 OHMS | Q4.5 - | ZTX753 |
| A12.13 - | 10K OHMS | Q6 - | ZTX653 |
| A14.16 - | 1K OHMS | C3 - | 1N4734A |
| A15 - | 91K OHMS | | |

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for providing current comprising:
a voltage regulator for regulating output voltage of a generating device to a predetermined level;
a voltage boost circuit for maintaining a desired current through the field coil of the generating device, said voltage boost circuit in electrical communication with the voltage regulator and activated when the voltage across the field coil falls below a desired level;
wherein the voltage boost circuit includes means for storing energy to maintain the desired current when the boost circuit is activated;
wherein the voltage boost circuit includes means for controlling when the storing means stores or releases its energy, said controlling means in electrical communication with said storing means;
wherein the voltage boost circuit includes an output port and wherein the storing means includes an inductor in communication with the generating device which obtains energy therefrom, and with the output port to provide current thereto;
wherein the storing means includes a capacitor in communication with the inductor to receive energy from it so it can be charged, and in communication with the output port to provide current to it when the capacitor is discharging.

2. An apparatus as described in claim 1 wherein the controlling means includes a switch in communication with the inductor and the capacitor for controlling whether they are charging or discharging; and a PWM which senses when voltage from the generating means is below a desired voltage and turns the switch on and off causing the inductor to charge and the capacitor to discharge when the switch is on, and causing the inductor to discharge and the capacitor to charge when the switch is off until the desired voltage at the output port is attained, said PWM in communication with the switch and the generating device.

3. An apparatus as described in claim 2 wherein the controlling means includes a diode for controlling current between the inductor and the capacitor, said diode forward biased when the switch is off and reversed biased when the switch is on.

\* \* \* \* \*